(12) United States Patent
Suh et al.

(10) Patent No.: US 8,638,936 B2
(45) Date of Patent: Jan. 28, 2014

(54) SECURITY PROTECTED NON-ACCESS STRATUM PROTOCOL OPERATION SUPPORTING METHOD IN A MOBILE TELECOMMUNICATION SYSTEM

(75) Inventors: Kyung Joo Suh, Seoul (KR); Sung Ho Choi, Suwon-si (KR); Jung Hyeon Kim, Hwaseong-si (KR); Jae Chon Yu, Suwon-si (KR); Eun Hui Bae, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 261 days.

(21) Appl. No.: 13/059,227

(22) PCT Filed: Aug. 14, 2009

(86) PCT No.: PCT/KR2009/004570
§ 371 (c)(1),
(2), (4) Date: Feb. 15, 2011

(87) PCT Pub. No.: WO2010/019020
PCT Pub. Date: Feb. 18, 2010

(65) Prior Publication Data
US 2011/0142239 A1   Jun. 16, 2011

(30) Foreign Application Priority Data
Aug. 15, 2008 (KR) .................. 10-2008-0080205

(51) Int. Cl.
*H04K 1/00* (2006.01)

(52) U.S. Cl.
USPC ........................................................ 380/270

(58) Field of Classification Search
USPC ........................................................ 380/270
See application file for complete search history.

(56) References Cited

U.S. PATENT DOCUMENTS

2002/0066011 A1   5/2002   Vialen et al.
2007/0249352 A1*  10/2007  Song et al. .................. 455/436

(Continued)

FOREIGN PATENT DOCUMENTS

| JP | 2008061276 | 3/2008 |
| KR | 1999-004237 | 1/1999 |
| WO | WO 2007/114623 A1 | 10/2007 |
| WO | WO 2008/055169 A2 | 5/2008 |

OTHER PUBLICATIONS

International Search Report dated Mar. 31, 2010 in connection with PCT Patent Application No. PCT/KR2009/004570.

(Continued)

*Primary Examiner* — Kambiz Zand
*Assistant Examiner* — Stephen Sanders

(57) ABSTRACT

The present invention relates to a method and system for the management of the mobility, the management of an idle mode, the registration management (management of attachment and detachment), and the location management (management of tracking area) of a terminal by using a non-access stratum (i.e., network stratum, hereinafter referred to as "NAS") in a mobile telecommunication network. To this end, the method for the management of mobility, the management of an idle mode, the registration management, and the location management of a terminal by using a NAS protocol, i.e., messages, according to an embodiment of the present invention, includes a terminal (hereinafter, referred to as "UE") and a mobility management entity (hereinafter, referred to as "MME"), and addresses to a method for efficiently processing security protected NAS messages if received messages are security protected NAS messages, in a case of sending or receiving messages serving as EMM (EPS Mobility Management) messages, i.e., mobility management messages, in a network such as an EPS (Evolved Packet System) of 3GPP, when the terminal performs handover in an active mode, performs location management in an idle mode, and registers to a network, thereby achieving improved efficiency in the mobility management, the position management, and the registration management of a terminal.

20 Claims, 10 Drawing Sheets

(56) References Cited

U.S. PATENT DOCUMENTS

| | | |
|---|---|---|
| 2007/0297611 A1 | 12/2007 | Yun et al. |
| 2008/0025263 A1 | 1/2008 | Pelkonen |
| 2008/0167054 A1 | 7/2008 | Shaheen |
| 2010/0195621 A1* | 8/2010 | Kekki et al. ............ 370/332 |
| 2010/0322128 A1* | 12/2010 | Becker et al. ............ 370/312 |
| 2011/0026484 A1* | 2/2011 | Fox et al. ............ 370/331 |

OTHER PUBLICATIONS

Nokia Corporation et al., "pCR: Kenb Security Alternative", 3GPP TSG SA WG3 Security—SA3#51, Vancouver, Canada, Apr. 14-18, 2008, 23 pages.

* cited by examiner

SECURITY PROTECTED NON-ACCESS STRATUM PROTOCOL OPERATION SUPPORTING METHOD IN A MOBILE TELECOMMUNICATION SYSTEM

CROSS-REFERENCE TO RELATED APPLICATION(S)

The present application is related to International Application No. PCT/KR2009/004570filed Aug. 14, 2009 entitled "SECURITY PROTECTED NON-ACCESS STRATUM PROTOCOL OPERATION SUPPORTING METHOD IN A MOBILE TELECOMMUNICATION SYSTEM" which claims priority to Korean Patent Application No. 10-2008-0080205 filed Aug. 15, 2008. International Application No. PCT/KR2009/004570 is assigned to the assignee of the present application and is hereby incorporated by reference into the present disclosure as if fully set forth herein. The present application hereby claims priority under 35 U.S.C. §119(a) to International Patent Application No. PCT/KR2009/004570 and Korean Patent Application No. 10-2008-0080205.

TECHNICAL FIELD

The present invention relates to a method for managing a user equipment of a mobile communication system and, in particular, to a method for supporting mobility, location, and registration managements of the User Equipment (UE) with NAS protocols efficiently.

BACKGROUND

As one of the representative mobile communication standardization organizations, the 3rd Generation Partnership Project (3GPP) has developed Evolved Packet System (EPS) and defined Mobility Management Entity (MME). In order to meet the high speed mobility and reinforced security requirements of such a next generation mobile communication system, it has been proposed to improve the NAS protocol used in the conventional mobile communication systems, especially the 3G system of 3GPP.

However, the NAS protocols and mobility, location, and registration management schemes of the NAS based on the NAS protocols are not matures to provide definitions of accurate procedures and properties for supporting the aforementioned functions. Also, the currently defined procedures and messages have malfunctioned and brought out unclear problems in association with the mobility, location, and/or registration managements in the real system. There is therefore a need of the definitions on the procedures for efficiently supporting the mobility, location, and registration managements, security protection of NAS protocols, and the roles of the UE and MME.

SUMMARY

In order to solve the problems of the prior arts, the present invention provides a method for supporting mobility, location, and registration managements protectively and efficiently with security protected NAS messages in an evolved mobile communication system such as 3GPP EPS. Also, the present invention defines the operations of the NAS protocols with the NAS messages between UE and MME. Accordingly, the present invention provides a method for supporting mobility, location, and registration managements of the UE using NAS protocols even between the 3GPP EPS and other radio access technology, i.e., non-3GPP system, as well as within the 3GPP EPS.

The present invention provides a method for supporting mobility management, idle mode management, registration management (attach and detach management), and location management (tracking area management) of the UE with the Non-Access Stratum (NAS) protocols in mobile communication networks. That is, the present invention provides a method for the support of mobility management, idle mode management, registration management, and location management of the UE using the NAS protocols, i.e., NAS messages. The mobile communication system of the present invention includes a User Equipment (UE) and a Mobility Management Entity (MME) and proposes a method for efficiently utilizing the security protected NAS messages in the network such as 3GPP EPS when the UE performs handover in active mode, location management in idle mode, and registration to the network.

In accordance with an aspect of the present invention, a method for processing state information of a UE in a mobile communication system includes sending, at the UE, a state transition request message to a new MME; receiving, at the new MME, an old key information from the an old MME; and sending, at the new MME, a response message after analyzing the request message using the old key information to the UE. Preferably, the old key information includes KSIasme and Kaseme.

Preferably, the method further includes sending, at the new MME, the UE a NAS security mode command message containing a new key information generated when failing interpretation of the request message; and sending, at the UE, the new MME a response to the NAS security mode command message generated with the new key information of the UE.

Preferably, the new key information generated by the new MME includes a NAS cipher key ($K_{NASenc}$) and an integrity key ($K_{NASint}$); the NAS security mode command message includes a security identifier (KSI), a UE security capability, a ciphering algorithm to be used, and an integrity algorithm; and the new key information generated by the UE includes a ciphering key ($K_{NASenc}$) and an integrity key ($K_{NASint}$) generated based on a basic security key ($K_{ASME}$) indexed by a security identifier (KSI) of the NAS security mode command message.

Preferably, the method further includes sending, at the new MME, a user authentication request message when failing interpretation of the request message with the old key and responding, at the UE, to the user authentication request message. Preferably, the user authentication request message comprises an authentication vector (AUTN) and a security key identifier (KSIASME).

Preferably, the state transition request message is one of a handover request message, a TAU request message, and attach (detach) request message.

In accordance with another aspect of the present invention, a method for processing state information of a UE in a mobile communication system includes sending, at the UE, a state transition request message which is security protected with a new key to a new MME; responding, at the new MME, to the state transmission request message by sending a user authentication request message to the new MME; generating, at the new MME, a new key and sending a NAS security mode command message having the new key to the UE; and generating, at the UE, a new key based on the new key information of the new MME and responding to the NAS security mod command message.

In accordance with another aspect of the present invention, a method for processing a handover in a mobile communication system includes sending, at an old MME, a forward relocation request message having old key information of the UE to a new MME; sending, at the UE, a TAU request message which is security protected with the old key to the new MME; and interpreting, at the new MME, the TAU request message with the old key. Preferably, the method further includes sending, at the new MME, a user authentication request message when failing interpretation of the TAU request message with the old key and responding, at the UE, to the user authentication request message; generating, at the new MME, a new key and sending a NAS security mode command message having information on the new key to the UE; generating, at the UE, the new key using the new key information of the new MME and responding to the NAS security mode command; and sending, at the UE, a TAU request message which is security protected with the new key to the new MME and processing, at the new MME, the message with the new key.

In accordance with another aspect of the present invention, a method for processing location update of a UE in a mobile communication system includes ending, at the UE, a TAU request message which is security protected with an old key to a new MME; requesting, at the new MME, the old MME for information related to an old key of the UE and receiving the old key information; and interpreting, at the new MME, the TAU request message with the old key and sending a TAU accept message which is security protected with the old key to the UE. Preferably, the method further includes sending, at the new MME, a user authentication request message when failing interpretation of the TAU request message with the old key and responding, at the UE, to the user authentication request; generating, at the new MME, a new key and sending a NAS security mode command message having information on the new key to the UE; generating, at the UE, a new key based on the new key information of the new MME and responding to the NAS security mode command; and sending, at the UE, a TAU request message which s security protected with the new key to the new MME and processing, at the new MME, the message with the new key.

In accordance with still another aspect of the present invention, a method for processing registration of a UE in a mobile communication system includes sending, at the UE, a registration request message which is security protected with an old key to a new MME; requesting, at the new MME, an old MME for information related to the old key of the UE and receiving the old key information; and interpreting, at the new MME, the registration request message and sending a registration Accept message which is security protected with the old key to the UE. Preferably, the method further includes sending, at the new MME, a user authentication request message when failing interpretation of the registration request message with the old key and responding to the user authentication request message; generating, at the new MME, a new key and sending a NAS security mode command message having information on the new key to the UE; generating, at the UE, a new key based on the new key information of the new MME and responding to the NAS security mode command message; and sending, at the UE, a registration request message which is security protected with the new key to the new MME and processing, at the new MME, the message with the new key.

Advantageous Effects

As aforementioned, the present invention relates to a method and system for supporting the idle mode management, registration management (Attach and detach management), and location management (tracking area management) of UE using the Non-Access-Stratum (NAS) in a mobile communication system. The method for supporting the mobility management, idle mode management, registration management, and location management using NAS protocols includes User Equipment (UE) and Mobility Management Entity (MME) and proposes a method for processing security protected NAS message efficiently when the EPS Mobility Management (EMM) as the mobility management message is sent or received in the network such as 3GPP EPS especially in cases of handover of the UE in active mode, location management of the UE in idle mode, registration of the UE with the network, thereby improving the mobility, location, and registration management efficiency.

DETAILED DESCRIPTION

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention. The following terms are defined in consideration of functions in the present invention, and the meanings thereof may vary according to the intention of a user or an operator or according to usual practice. Therefore, the definitions of the terms must be interpreted based on the entire content of the present specification.

In the following description, the term "state transition request message" means any of handover request message, Tracking Area Update (TAU) request message, and attach (detach) request message. The term "old key" means the information related to the security key used in the old MME (serving MME) to which the UE is connected, and the term "new key" means the information related to the security key to be used by a new MME (target MME) to which the UE connects according to the state transition.

The term "old key information" means the information received from the old MME and includes the security information such as basic security key identifier (KSIASME) and a basic security key (KASME), and the KASME (Key access security management entity) can include a cipher key KNASenc) for ciphering the NAS message, an integrity key (KNASint) for integrity protection of NAS message, and a security key for generating an evolved Node B key (KeNB) for protecting the AS (Access Stratum) message at the radio interface.

The term "user authentication request message" means an authentication message for generating a new key between the new MME and UE and can include an authentication token (AUTN), as authentication vector, and the security identifier (KSIASME).

The term "NAS Security mode command message" means the message which the new MME sends to the UE after creating the new key and can include a key set index, a UE security capability as the information on the security algorithm supported by the UE, a ciphering algorithm to be used, and an integrity algorithm to be used.

The present invention provides a method for supporting mobility management, location management, and registration management in a mobile communication system using NAS protocols between UE and MME. Although the description is directed to the 3GPP EPS system, the present invention can be applied to other mobile communication systems using NAS.

Figure 1:
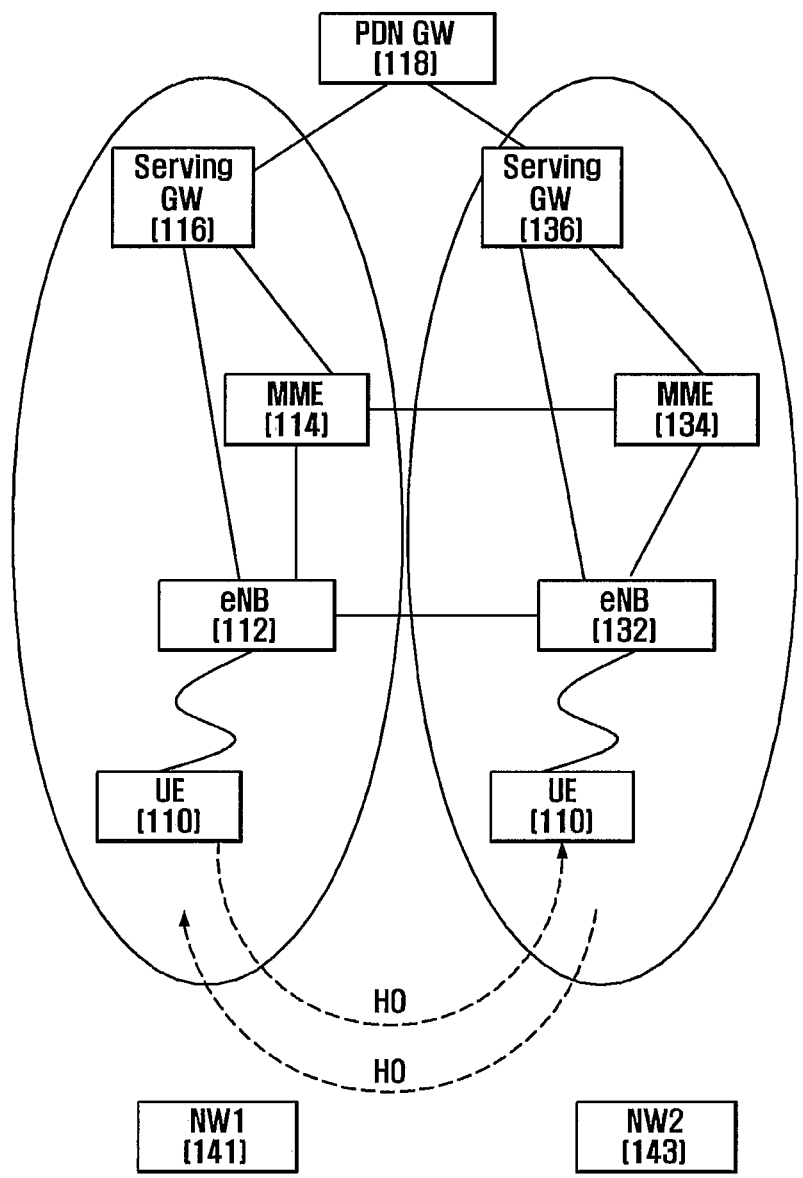
FIGS. 1 and 2 are drawings illustrating the structure and operations for handover in the mobile communication system according to an embodiment of the present invention.

Although the embodiment of FIG. 1 is directed to the case where two 3GPP EPS networks exist, the present invention can be applied for handover of the UE from a 3GPP EPS to another 3GPP EPS, 3GPP UMTS network, 3GPP GPRS network, WiMAX network, or 3GPP2 radio access network using NAS. The method for supporting mobility management, location management, and registration management using NAS protocols according to the present invention can be applied to other types of mobile communication systems having similar technical background and channel formats without departing from the spirit and scope of the present invention.

FIG. 1 is a diagram illustrating a handover situation in a mobile communication system environment according to an embodiment of the present invention. In this embodiment, a description is made of a 3GPP EPS.

Referring to FIG. 1, an evolved Node Base Station (hereinafter, interchangeably referred to as E Node B or eNB) 112 establishes radio connection with the User Equipment (hereinafter, referred to as UE) 110 located within the cell as the service coverage of the eNB. The UE 110 is the terminal accessing a packet data network such as Internet via a serving gateway (hereinafter, interchangeably referred to as Serving GW or SGW) 116. In the following description, a Packet Data Network Gateway (hereinafter, referred to as PDN GW) 118, as an important network entity of the packet data network of the present invention, acts as the role of Home Agent (hereinafter, referred to as HA).

There exists interface and data paths for managing mobility of UEs between the eNB 112(132) and Serving GW 116(136) and between MME 114(134) and Serving GW 116(136). In an embodiment of the present invention, the UE 110 and MME 114(134) have a NAS protocol stack for supporting mobility management, location management, registration management, and session management.

In an embodiment of the present invention, the UE 110 can make a handover from NW1 141 to NW2 143 or from NW2 to NW1. In an embodiment of the present invention, there can be interfaces between the MMEs 114 and 134 and between the eNBs 112 and 132 for the mobility management, location management, and registration of the UE 110.

In an embodiment of the present invention, the description is directed to the NAS protocol operating between the MME 114 and the UE 110, the MME being introduced for mobility, location, and session managements of the UE. That is, the NAS protocol operating between the UE 110 and the MME 114 for the mobility, location, and session management is evolved to reinforce the security along with the modification in the mobility and session management functions.

Figure 2:
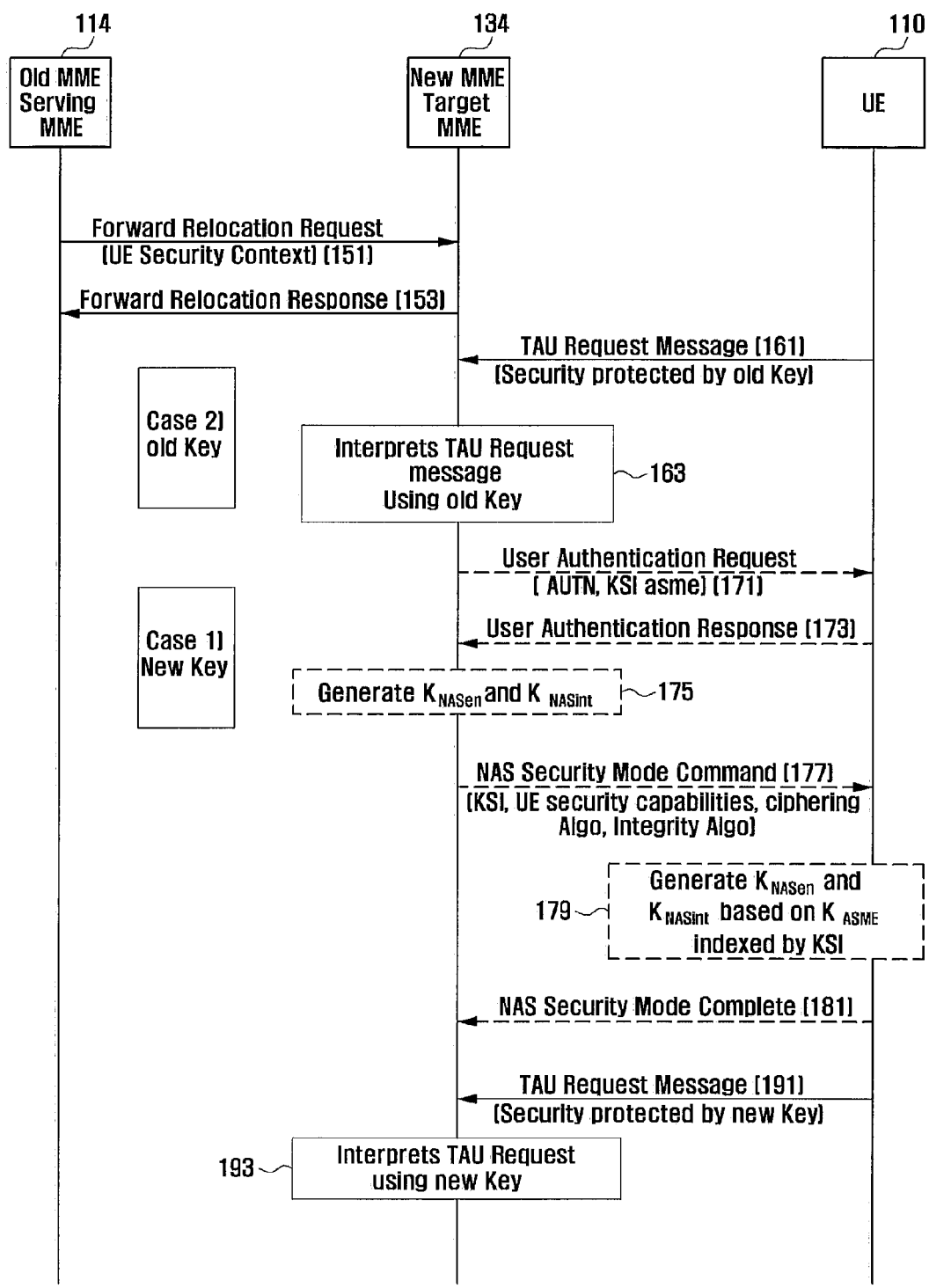

FIG. 2 is a signaling diagram illustrating a procedure for handover with the NAS protocol between MME and UE in a mobile communication system structured as shown in FIG. 1 according to an embodiment of the present invention.

Referring to FIGS. 1 and 2, in the handover situation, the new MME 134 can operate in three ways as follows. An embodiment is the case 2 including steps 151 to 153 of FIG. 2 in which the new MME 134 uses the security-related information received from the old MME 114. Another embodiment is the case 1 corresponding to steps 151, 153, 171 to 179, 181, 191 and 193 which includes a procedure for interpreting messages using new security-related information along with the authentication procedure (171 and 173) and security mode command procedure (175 to 181). Another embodiment is the case 3 in which steps 151, 153, 161, 163, and 171 to 181 are performed, and particularly, when the result of the interpretation of the TAU request with the old security key at step 163 after performing steps 151, 153, 161, and 163 has failed the security authentication, steps 171 to 181 are performed.

Referring to FIG. 2, in case 2, the serving MME (old MME) 114 sends a Forward Relocation Request message to the target MME (new MME) 134 at step 151. Here, the Forward Relocation Request message contains UE security context. Upon receipt of the Forward Relocation Request message, the target MME 134 sends a Forward Relocation Response message to the serving MME 114. Afterward, the UE 110 sends a TAU Request Message to the target MME 134 at step 161, the TAU request message being security protected by old key. Upon receipt of the TAU Request message, the target MME interprets the TAU Request message using the old key.

As aforementioned, in case 2 of FIG. 2, the serving MME (i.e., old MME before handover) sends the Forward Relocation Request message containing the UE security context o the target MME (i.e., new MME) 134. The UE security context can be included. Upon receipt of the Forward Relocation Request message, the new MME 134 sends the Forward Relocation Response message to the old MME 114. Afterward, the UE 110 sends the TAU Request message which is security protected by the old key to the new MME 134 which interprets the TAU request message using the old key.

Referring to FIG. 2, in case 1, the serving MME 114 and target MME 134 performs steps 151 and 153 to exchange the Forward Relocation Request message and Forward Relocation Response message. Next, the target MME 134 sends a User Authentication Request message to the UE 110 at step 171. The User Authentication Request message contains the authentication vector (AUTN) and the security identifier (KSIASME). In response to the User Authentication Request message, the UE 110 a User Authentication Response message to the target MME 134 at step 173. Upon receipt of the User Authentication Response message, the target MME 134 generates a cipher key (KNASenc) and integrity key (KNASint).

Afterward, the target MME 134 sends a NAS Security Mode Command containing key set index (KSI), UE security capabilities, ciphering algorithm, integrity algorithm, etc to the UE 110 at step 177. Upon receipt of the NAS Security Mode Command, the UE 110 generates a cipher key (KNASint) and an integrity key (KNASint) based on the KASME indexed by KSI at step 179. As a result of step 179, the target MME 134 and the UE 110 share the same key value. Next, the UE 110 sends a NAS Security Mode Complete message to the target MME 134 at step 181 and ends the NAS security mode command process.

Afterward, the UE sends a TAU Request message which is security protected by the new key, i.e. new cipher key (KNASenc or integrity key (KNASint), and the target MME 134 interprets the TAU Request message using the new key.

As aforementioned, in case 1 of FIG. 2, the old MME 114 and the new MME 134 exchange the Forward Relocation Request message and the Forward Relocation Response message. Afterward, the new MME 134 sends the UE 110 the User Authentication Request message containing the AUTN and $KSI_{ASME}$). In response to the User Authentication Request message, the UE sends the User Authentication Response message. Upon receipt of the User Authentication Response message, the new MME 134 generates the cipher key ($K_{NASenc}$) and integrity key ($K_{NASint}$) and sends the NAS Security Mode Command message to the UE 110. At this time, the NAS Security Mode Command message contains key set index (KSI), UE security capabilities, ciphering algorithm, integrity algorithm, etc. Upon receipt of the NAS Security Mode Command message, the UE 110 generates the cipher key ($K_{NASenc}$) and integrity key ($K_{NASint}$) based on the KASME indexed by KSI such that the MME 134 and UE 110 share the same key values. Next, the UE 110 sends a NAS Security Mode Complete message to the target MME 134 so as to end the NAS security mode command process, and then sends the TAU Request message protected by new security key, i.e. the new cipher key ($K_{NASenc}$) or integrity key ($K_{NASint}$).

Referring to FIG. 2, the case 3 can be the case where the case 1 where the TAU Request message has failed security authentication. That is, after performing steps 151, 153, and 161, if the target MME 134 fails the security authentication at the TAU Request message interpretation using the old security key at step 163, the target MME 134 and the UE 110 performs the process corresponding to the case 2 at steps 171 to 181 to generate a new security key and carries out the NAS Security Mode by sharing the new security key. Afterward, the UE 110 sends the TAU Request message which is security protected by the new key, i.e. new cipher key (KNASenc or integrity key (KNASint), and the target MME 134 interprets the TAU Request message using the new key, and the target MME 134 interprets the TAU Request message using the new key.

As described above, in case 3 of FIG. 2, if the security authentication has failed through the result of the TAU Request message interpretation using the old security key, the new MME 134 and the UE 110 generate and share a new security key and processes the TAU Request message using the new security key.

Figure 3:
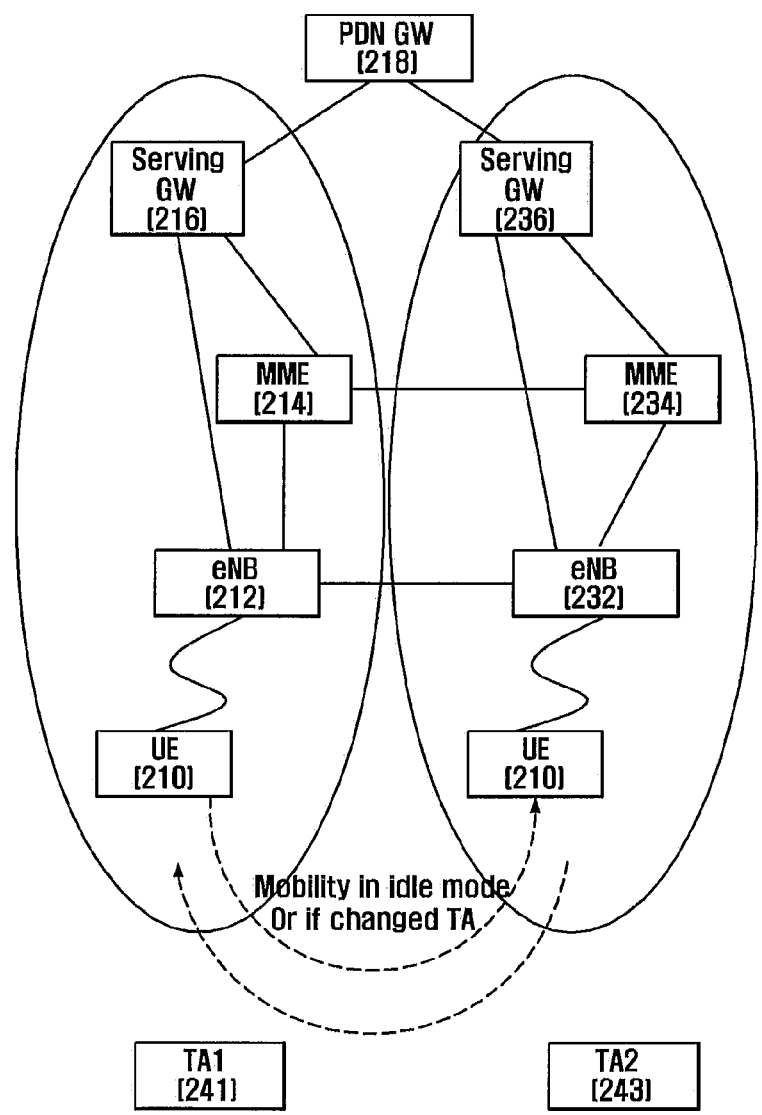
FIGS. 3 and 4 are drawings illustrating the structure and operations for location management in a mobile communication system according to an embodiment of the present invention.

FIG. 3 is a diagram illustrating a location management situation in a mobile communication system environment according to an embodiment of the present invention. In this embodiment, the description is made under the assumption that the mobile communication system is the 3GPP EPS.

Referring to FIG. 3, the functional entities and structural configuration environment of the mobile communication is similar to that of FIG. 1. For example, the mobile communication system environment illustrated in FIG. 3 includes a UE 210, an eNB 212, an MME 214, a Serving GW 216, a PDN GW 218, an eNB 232, an MME 234 and a Serving GW 236 similar to the mobile communication system environment illustrated in FIG. 1. In FIG. 3, the description is directed to the location management functionality. That is, unlike FIG. 1 in which the UE 110 is in active mode, the UE 210 in FIG. 3 is in idle mode for saving power consumption or moves from an tracking area 1 (TA 1) 241 to a tracking area 2 (TA2) 243 after handover in active mode in the environment of FIG. 3. In this case, it is necessary to manage the location of the UE. The tracking area (TA) is a concept used for managing location roughly although it locates the UE accurately as in unit of cell.

Figure 4:
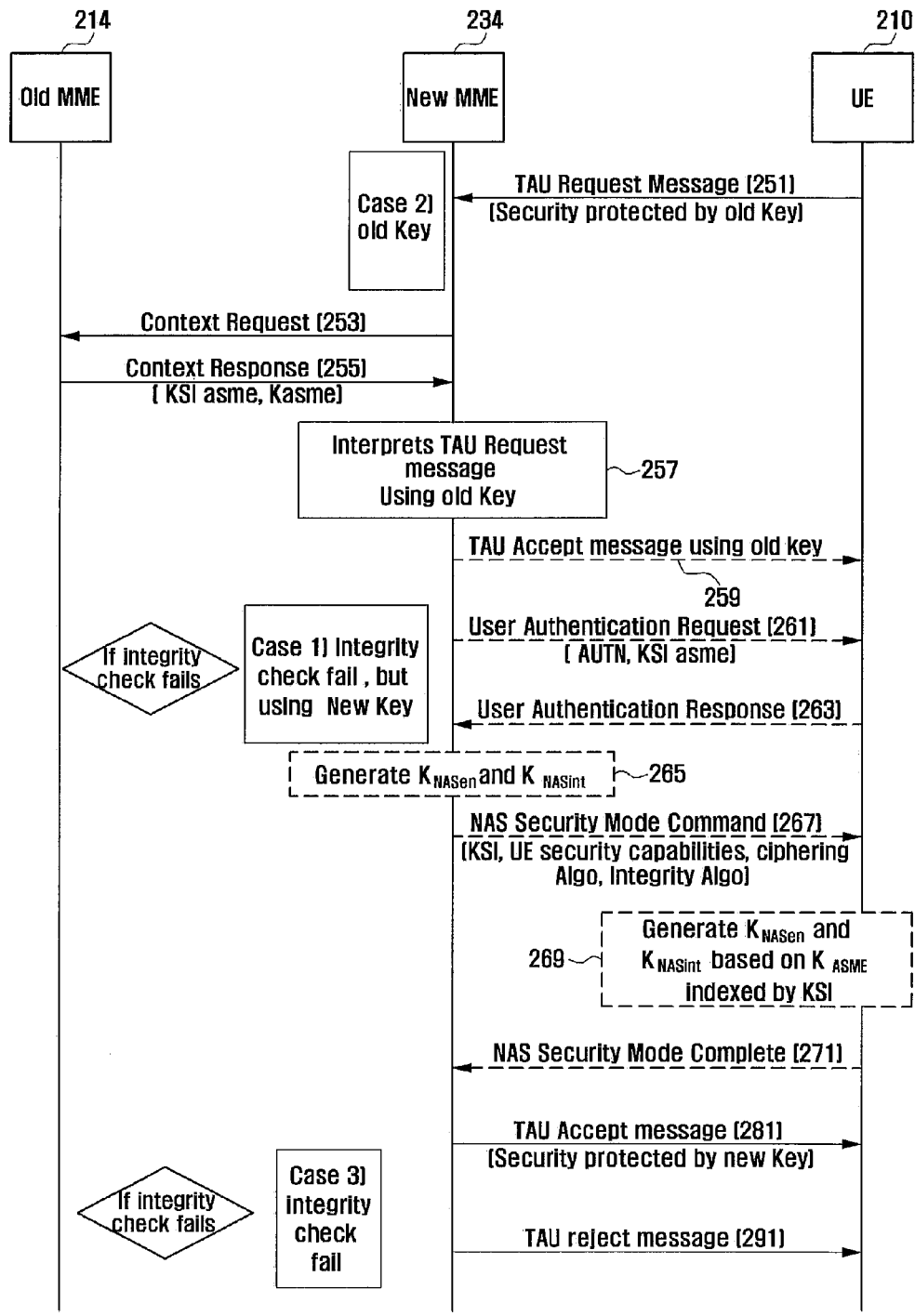

FIG. 4 is a signaling diagram illustrating operations of MME for location management in the mobile communication system structured as shown in FIG. 3 according to an embodiment of the present invention. In the location management situation, the new MME 234 can operate in three ways as follows.

In the location management situation of case 2, the new MME 234 uses the security-related information received from the old MME through steps 251 to 259. The location management situation of case 1 includes steps 251 to 257, 261 to 269, 271, and 181. That is, case 1 includes the procedure for interpreting the message using the new security-related information in addition of the authentication procedure (261 and 263) and the security mode command procedure (265 to 271). In case 1, when the attempt for interpreting the message with the old security context received from the old MME 214 fails, the new MME 234 and UE 210 performs the authentication and security procedure through steps 261 to 271 to generate and share a new security information and, as a consequence, performs the procedure in which a message is sent with the new security information and the reply message is interpreted with the new security information. Case 3 is the case where the message verification fails through steps 251 to 257 and, when the authentication procedure or the security procedure fails through steps 261 to 271 in need of the new security authentication procedure, the MME 234 sends the location registration reject message to the UE 210 at step 291 unlike case 1.

The procedures of case 1, case 2, and case 3 are described in association with the operations of the UE and MME for the location management of the UE are described in more detail hereinafter. In case 2, the UE 210 sends a TAU Request message which is security protected by the old key to the new MME 234 at step 251. Upon receipt of the TAU Request message, the new MME 234 sends a Context Request message to the old MME 214 to request for the information on the UE. The old MME 214 sends a Context Response to the new MME 234 in response to the Contact Request message at step 257. The Context Response message includes the UE security information such as basic security key identifier (KSIASME) and basic security key (KASME). Here, the KASME (Key access security management entity) is used for generating the security key (KNASenc) used for ciphering protection of the NAS message, NAS integrity key (KNASint) used for the integrity protection, and the evolved Node B key (KeNB) used for protecting the Access Stratum (AS) message.

Next, the new MME 234 interprets the TAU Request message received from the UE 210 at step 251 using the old key (257). That is, if the TAU Request message as the location registration message sent from the UE 210 to the new MME 234 is security protected with the old key, the new MME 234 interprets the TAU Request message using the old key at step 257. Here, the old key includes the NAS cipher key (KNASenc) and NAS integrity key (KNASint) used for protecting the NAS in the communication between the UE 210 and old MME 214. Next, the new MME 234 sends TAU Accept message, which is security protected using the old key, to the UE 210 (259).

In case 2 for the location management of the UE, if the TAU Request message which is security protected by the old key is received from the UE 210, the new MME 234 sends the Context Request message to the old MME 214 to request for the information on the UE 210. Upon receipt of the Context Request message, the old MME 214 sends the Context Response message containing the security information of the UE such as KSIasme and Kasme to the new MME 234. The new MME 234 interprets the TAU Request message received from the UE 110 using the old key carried in the Context Response message sent by the old MME 214 and sends the TAU Accept message which is security protected using the old key to the UE 210. That is, if the TAU Request message which is security protected with the old key is received, the new MME 234 requests the old MME 214 for the old key information of the UE 210, interprets the TAU Request message using the old key to register the location, and sends the TAU Accept message which is security protected using the old key to the UE 210.

In case 1 for location management of UE, steps 251 to 257 are performed in the same manner as case 2. If it fails to interpret the TAU Request message using the old key at step 257, the new MME 234 sends a User Authentication Request message to the UE 210 (261). The User Authentication Request message includes an authentication vector, i.e. AUTN (authentication token) and a security key identifier (KSIASME). In response to the User Authentication Request message, the UE 210 sends a User Authentication Response message to the new MME 234.

Upon receipt of the User Authentication Response message, the new MME 234 generates new security information, i.e. cipher key (KNASenc) and integrity key (KNASint). Next, the new MME 234 sends a NAS Security Mode Command message to the UE 210 (267). The NAS Security Mode Command message contains the cipher key identifier (key set index), UE security capability, ciphering algorithm, and integrity algorithm. Upon receipt of the NAS Security Mode Command message, the UE 210 generates KNASenc and KNASint based on the KASME indexed by KSI (269). As a consequence of step 269, the new MME 234 and the UE 210 share the same cipher key value. Next, the UE 210 sends a Security Mode Complete message to the new MME so as to finish the NAS security mode command procedure (271). Upon receipt of the NAS Security Mode Complete message, the new MME 234 sends a TAU Accept message, which is a location registration response message protected using the new cipher key (KNASenc) or integrity key (KNASint), to the UE 210 (281).

If it fails for the new MME 234 to interpret the TAU Request message protected by the old key or to acquire the old key, the new MME 234 generates new security keys (KNASenc and KNASint) and sends the NAS Security Mode Command message to the UE 210 such that the UE 210 generates new security keys (KNASenc and KNASint). As a consequence of the NAS Security mode procedure, the new MME 234 and the UE 210 share the same security keys.

In case 3 for the location management of the UE 210, steps 251 to 257 and 261 to 271 are performed in such a manner that, when it fails to interpret the TAU Request message using the old key at step 257, steps 261 to 271 are performed. Unlike case 2, in case 3 if the authentication procedure of steps 261 and 263 fails or, although the authentication procedure succeeds, the Security Mode Command (SMC) procedure is erroneous at any of steps 267 to 271, the UE 210 and the new MME 234 have different security keys. In this case, the new MME 234 sends a TAU Reject message to the UE (291).

In case 3 for the location management procedure, if the user authentication or the NAS Security mode procedure fails between the new MME and the UE fails in the situation where the TAU Request message is not interpreted with the old key, the new MME and the UE have different security keys and thus the new MME sends the TAU Reject message to the UE.

Figure 5:
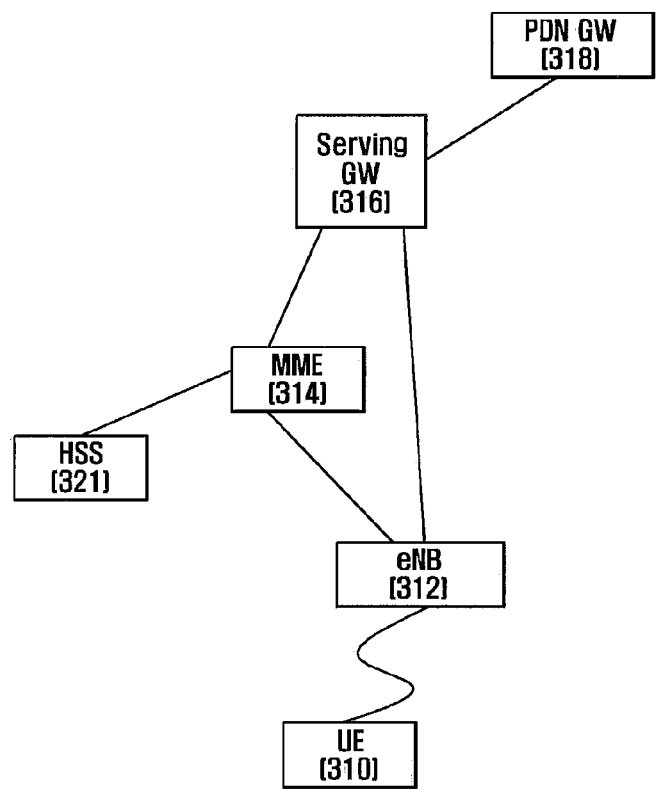
FIGS. 5 and 6 are drawings illustrating the structure and operations for registration procedure of UE according to an embodiment of the present invention.

FIG. 5 is a diagram illustrating a UE registration situation in a mobile communication system environment including the UE 310, an eNB 312, an MME 314, a Serving GW 316, a PDN GW 318, and a HSS 321 according to an embodiment of the present invention.

Referring to FIG. 5, when the UE 310 first attempts to connect to the network, an attach procedure can be performed. Meanwhile, when the UE 310 is not need to be connected to the EPS network, a detach procedure can be performed; and also when the UE 310 has no communication with the MME 314 for a long time or the network operations determines disconnection, the UE 110 can perform the detach procedure.

Figure 6:
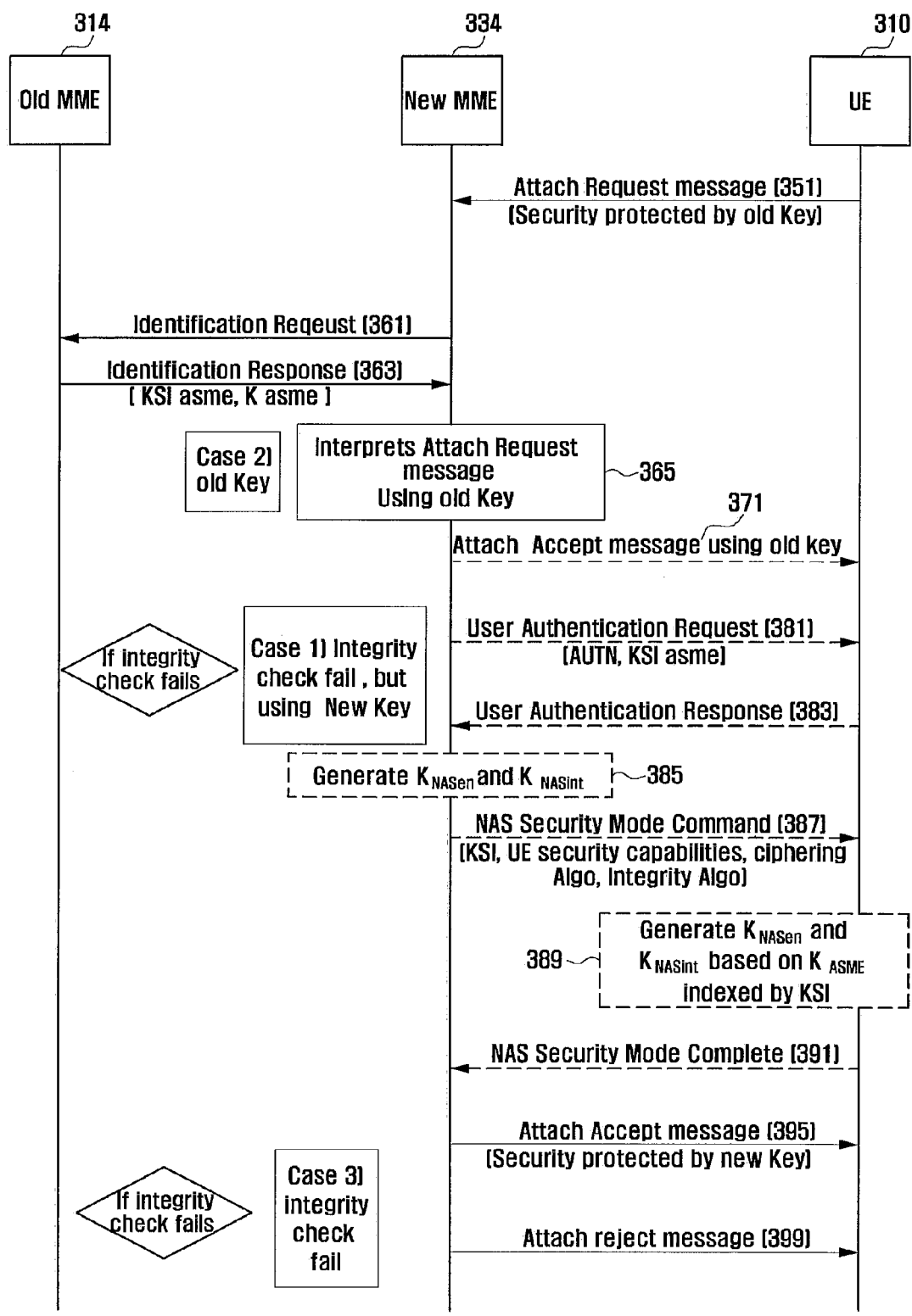

FIG. 6 is a signaling diagram illustrating UE attach and detach procedure in the mobile communication system structured as in FIG. 5.

Referring to FIGS. 5 and 6, the new MME 334 can operate in three manners (case 1 to case 3) in UE attach procedure as follows.

In case 2, steps 351, 361 to 365, and 371 can be performed, and the new MME 334 use the security information received from the old MME 314. In case 1, steps 351, 361 to 365, 381 to 391, and 395 can be performed and a procedure for interpreting a message using new security information in addition to the authentication procedure of steps 381 and 383 and a security mode command procedure of steps 385 to 391. Case 1 is the case where it fails to interpret the message using old security context received from the old MME 314 and includes the procedure in which messages are exchanged using the new security information acquired through the authentication and security procedure of steps 381 to 391 and the messages are interpreted using the new security information. Case 3 is the case where the security authentication of the message fails after performing steps 351 and 361 to 365, and unlike case 1, when the authentication procedure or security procedure fails through steps 381 to 391 in need of the new security authentication procedure, the MME sends the attach reject message to the UE 310 in response to a UE registration (attach or detach) request.

The procedures of the three cases are described in detail hereinafter.

In the procedure of case 2, the UE 310 sends an Attach Request message, which is security protected by the old key, to the new MME 334 (351). Upon receipt of the Attach Request message, the new MME 334 sends an Identification Request message to the old MME 314 to request for the information on the UE 310 (361). In response to the Identification Request message, the old MME 314 sends an Identification Response message to the new MME 334 (363). The Identification Response message contains the basic security identifier (KSIASME) and the basic security key (KASME) as the security information of the UE. The KASME (Key access security management entity) is used for generating the security key (KNASenc) used for ciphering protection of the NAS message, NAS integrity key (KNASint) used for the integrity protection, and the evolved Node B key (KeNB) used for protecting the Access Stratum (AS) message. Upon receipt of the Identification Response message, the new MME 334 interprets the Attach Request Message sent by the UE 310 at step 351 using the old key (365). The old key includes the NAS security key (KNASenc) and NAS integrity key (KNASint) for protecting NAS messages used in communication between the UE 310 and the old MME 314. After interpreting the Attach Request message using the old key, the new MME 334 sends an Attach Accept message which is security protected using the old key to the UE 310 (371).

In the procedure of case 1, steps 351 and 361 to 365 are performed in the same manner as case 2. However, when it fails to interpret the Attach Request message, which is security protected using the old key, at step 365, the new MME 334 sends a User Authentication Request message to the UE 310 (381). The User Authentication Request message contains the authentication vector, i.e., AUTN (authentication token), and the authentication key identifier (KSIASME). In response to the User Authentication Request message, the UE 310 sends a User Authentication Response message to the new MME 334 (383).

Once the user authentication is successful with the User Authentication message exchange, the MME 334 generates a cipher key ($K_{NASenc}$) and an integrity key ($K_{NASint}$) (385). Next, the new MME 334 sends a NAS Security Mode Command message to the UE 310 (387). The NAS Security Mode Command message contains the security key identifier (key set index, KSI), the UE security capability as the information about the security algorithm supported by the UE, the ciphering algorithm to be used, and the integrity algorithm to be used. Upon receipt of the NAS Security Mode Command message, the UE 310 generates the cipher key ($K_{NASenc}$) and integrity key ($K_{NASint}$) based on the $K_{ASME}$ indexed by the KSI (389) and, as a consequence, shares the same key value with the new MME 334 (389). Next, the UE 310 sends a Security Mode Complete message to the new MME 334 to complete the NAS security mode command procedure. Afterward, the new MME 334 sends an Attach Accept message, as the attach registration response, protected by the security key, i.e. $K_{NASenc}$ or $K_{NASint}$, to the UE 310 (395).

In the procedure of case 3, steps 351, 361 to 365, 381, and 391 are performed in such a manner that when the new MME 334 fails to authenticate the user as the consequence of the interpretation of the Attach Request message using the old key, steps 371 to 191 are performed. Unlike case 2, in case 3, when the authentication procedure fails at any of steps 381 and 383 or Security Mode Command (SMC) procedure fails at any of steps 367 to 391 even with the successful authentication procedure, the UE 310 and the new MME 334 have different security keys. In this case, the new MME 334 sends the Attach Reject message to the UE 310 (399).

The description has been directed to the cases where, if a state transition message (here, handover, TAU, and attach (detach) request message) is received, the new MME receives the old key from the old MME and interprets the corresponding request message using the old key. However, the MME can generate a new key and interprets the message with the new key without the process for interpreting a mess with the old key. that is, when a state transition message (here, handover, TAU, attach (detach) request message) is received, the MME can generates a new key to process the request message without the old key-based request message interpretation process (steps 151, 153, and 163 of FIG. 2, 253, 255, 257, and 259 of FIG. 4, and 361, 363, 365, and 371 of FIG. 6).

Figure 7:
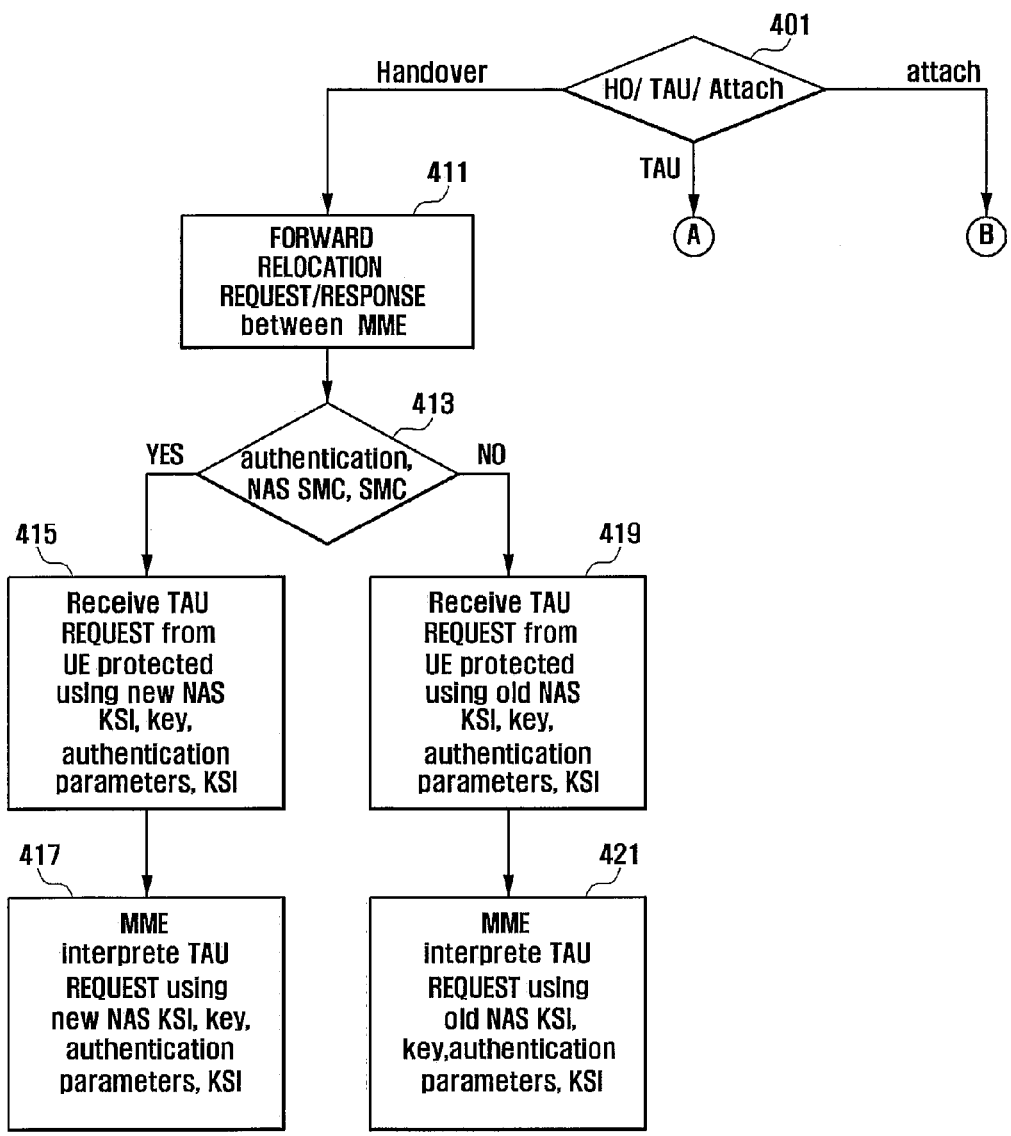
FIGS. 7 to 9 are a flowchart illustrating mobility management, location management, and registration management procedures of an MME in a mobile communication system according to an embodiment of the present invention.
Figure 8:
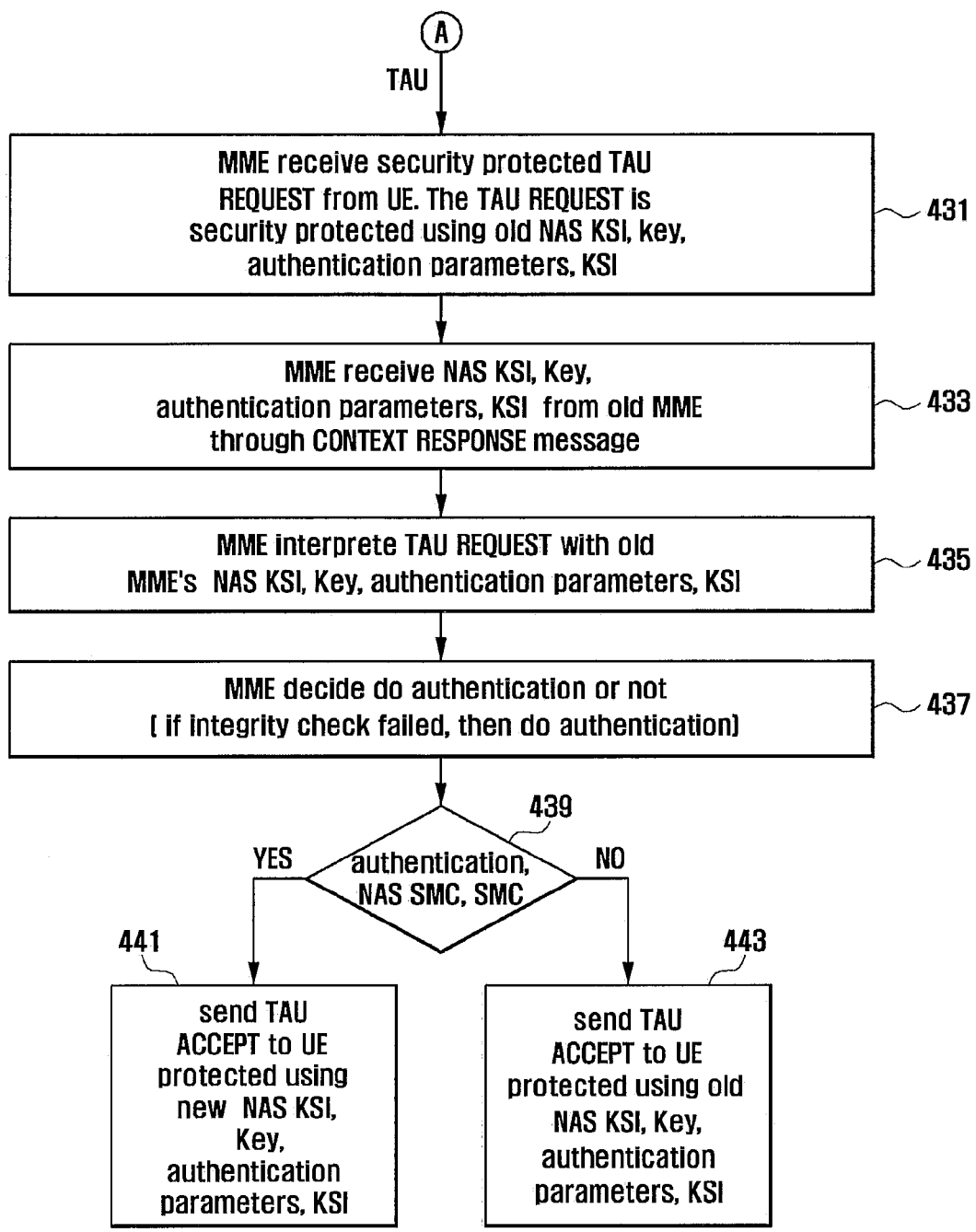
Figure 9:
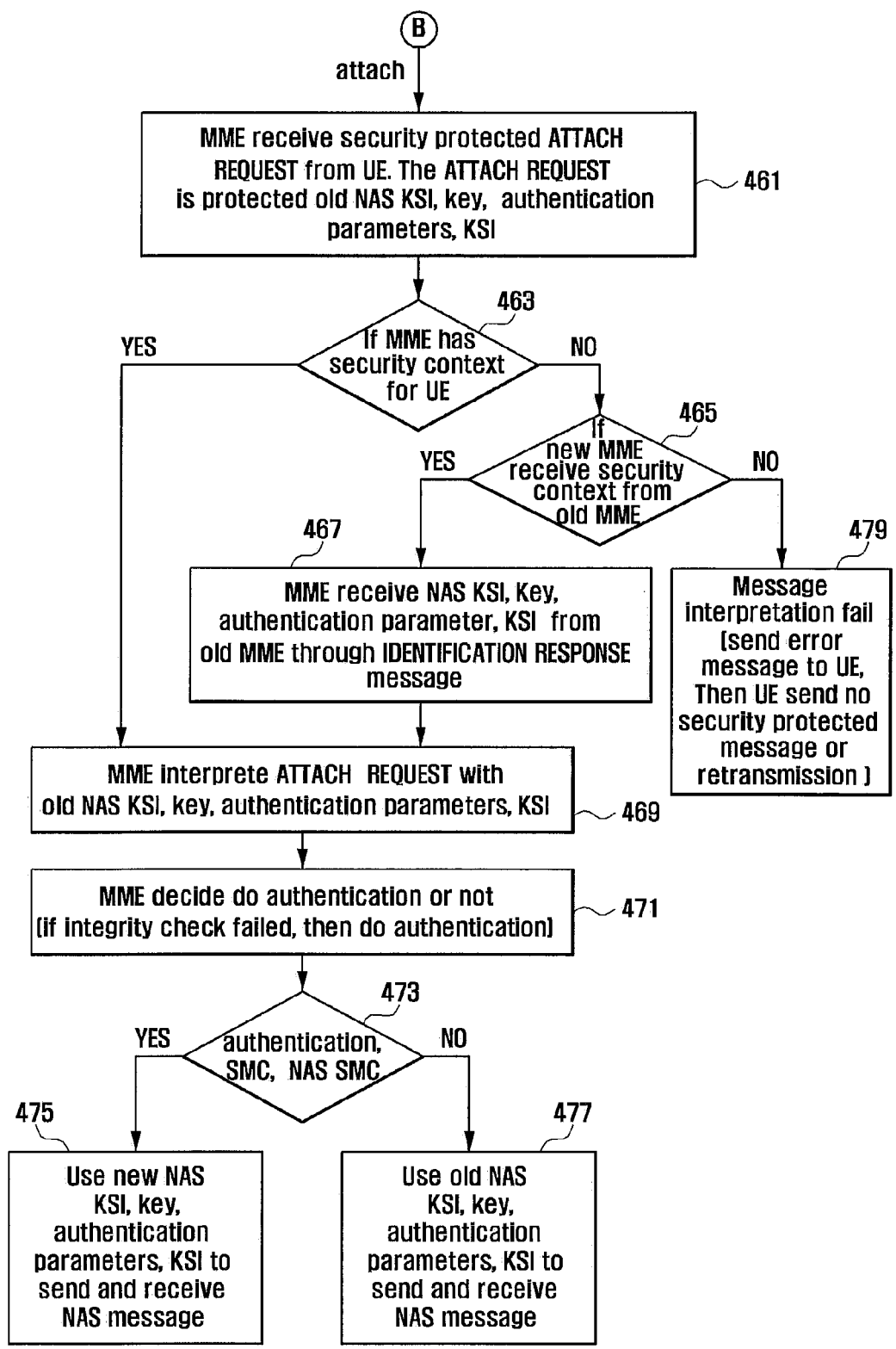
Figure 10:
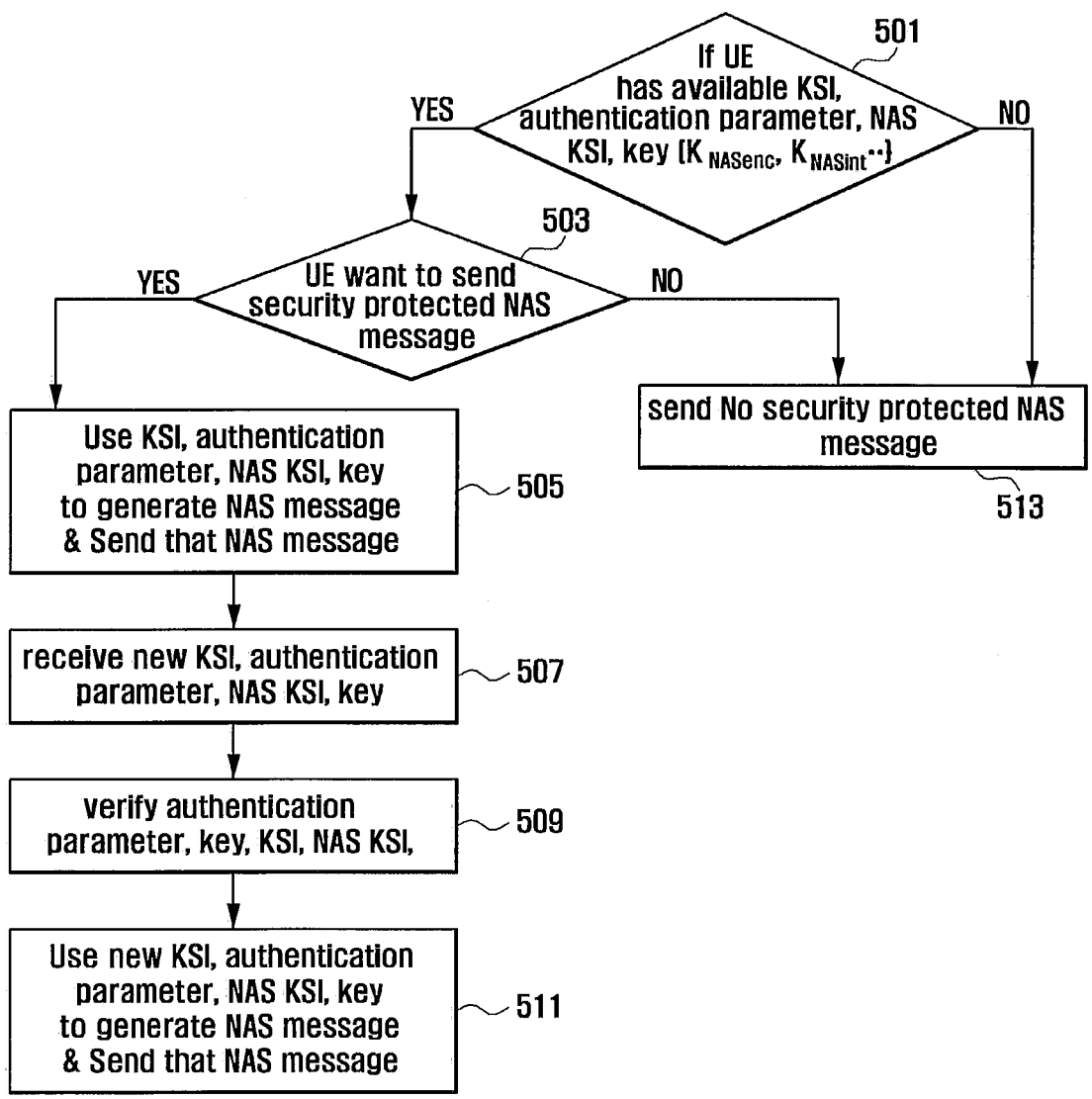
FIG. 10 is a flowchart illustrating mobility management, location management, and registration management procedures of a UE in an embodiment of the present invention.

FIGS. 7 to 9 are a flowchart illustrating a mobility, location, and registration management procedure of an MME in the mobile communication system according to an embodiment of the preset invention. FIG. 10 is a flowchart illustrating a mobility, location, and registration management procedure of a UE in a mobile communication system according to an embodiment of the present invention. Although the descriptions made with reference to FIGS. 7 to 10 are directed to the case when the MME interprets a message sent by the UE, the present invention can be applied to the case where the UE interprets the message sent by the MME unless the operation features do not differ from each other. Detailed descriptions on the messages, excluding the context to be exchanged for the operations of the MME and UE as shown in FIGS. 7 to 10, are omitted herein.

Referring to FIGS. 7 to 9, the NAS protocols are used for supporting the aforementioned management procedures between the UE and MME. The NAS protocols include a security protected NAS protocol and a non-security protected NAS protocol, and there are EPS Mobility Management (EMM) NAS messages and EPS Session Management (ESM) NAS messages for supporting the EPS NAS protocols. If a request message (handover request, TAU Request, or attach (detach) request) is received, the MME analyzes the types of the request (401) and operates depending on which message (i.e. handover, location management, registration request message) is received.

If it is determined that a handover request message is received at step 401, the procedure goes to step 411 such that the MME performs handover-related process. In an embodiment of the present invention, it is assumed that the UE 110 moves from the network NW 1 141 under control of the MME 114 to the network NW 2 143 under control of the MME 134 in the environment of FIG. 1. Although there can be the case where the Serving GW is switched for another GW for a handover, it is also possible to switch the MME for another MME without changing the Serving GW.

In case of handover, the serving MME (or old MME) 114 sends the information on the UE to the target MME by means of a FORWARD RELOCATION REQUEST/RESPONSE message. The information includes the security-related parameters, i.e. KSI (key set identifier), authentication parameter or authentication vector, and security Key including NAS KSI (key set identifier), NAS cipher key (KNASenc) or integrity key (KNASint). The target MME determines whether to perform the new user authentication and/or security mode command procedure with the UE (413). If it is determined to perform the new authentication procedure and/or security mode command (SMC) procedure with the UE, the MME acquires the security key including new security-related parameters, i.e. KSI (key set identifier, authentication parameter or authentication vector, NAS KSI (key set identifier), and NAS cipher key (KNASenc) or integrity key (KNASint) through the authentication procedure or security mode command procedure.

If Accordingly, if it is determined to perform the authentication, SMC, or NAS SMC procedure (413), the target MME receives a TRACKING AREA UPDATE REQUEST (hereinafter, referred as TAU REQUEST) NAS message which is security protected using the security key including the NAS KSI (key set identifier), NAS cipher key ($K_{NASenc}$) or integrity key ($K_{NASint}$) from the UE (415). Once the TAU Request NAS message is received, the MME interprets the TAU REQUES message using the security key including the new security-related parameters, i.e. KSI (key set identifier), authentication parameter or authentication vector, NAS KSI (key set identifier), and NAS cipher key ($K_{NASenc}$) or integrity key ($K_{NASint}$) (417).

If it is determined not to perform the authentication, SMC, and NAS SMC (413), the MME receives the TAU REQUEST message which is security protected using the old key including the security parameters used between the MME and UE, i.e. the old parameters such as old KSI (key set identifier), old authentication parameter or authentication vector, old NAS KSI (key set identifier), and old NAS cipher key (KNASenc) or old integrity key (KNASint) from the UE (419). Next, the MME interprets the TAU REQUEST message using the old security key including the security parameters used between the MME and UE, i.e. the old parameters such as old KSI (key set identifier), old authentication parameter or authentication vector, old NAS KSI (key set identifier), and old NAS cipher key (KNASenc) or old integrity key (KNASint) (421).

If it is determined that a TRACKING AREA UPDATE (hereinafter, referred to as TAU) message is received at step 401, the procedure goes to step 431 such that the target MME performs TAU REQUEST process. The TAU REQUEST message is security protected using the old security key including the old security parameters used between the old serving MME and the UE 110 such as KSI (key set identifier), old authentication parameter or authentication vector, old NAS KSI (key set identifier), and old NAS cipher key (KNASenc) or old integrity key (KNASint). In this case, the new MME receives the security-related parameters from the old MME by means of the CONTEXT RESPONSE message. In order to receive the security parameters form the old MME, the new MME has to know the old MME and the UE. That is, when the TAU REQUEST message is received at step 431, the new MME must know the Last visited registered Tracking area identity (TAI) and the UE identifier, i.e. the old globally unique temporary identifier (GUTI) in order to recognize the old MME and UE, and, although being security protected, it must not be ciphered such that the new MME can requests the old MME for the security parameter information. Once the security parameters (NAS KSI, key, authentication parameter, and KSI) are received from the old MME at step 433, the new MME interprets the TAU REQUEST message with old security parameters (the NAS key, authentication parameters, and KSI of the old MME) (435).

Next, the new MME decides whether to perform authentication procedure (437). If the integrity check fails, then the new MME performs authentication procedure. Particularly, when the security authentication fails at step 435, the new MME has to perform the authentication procedure at step 439. If it is decided to perform the authentication, NAS SMC, or SMC procedure at step 439, the new MME sends a TAU ACCEPT message, which is protected using the new security parameters, to the UE (441). Otherwise, if it is decided not to perform the authentication, NAS SMC, or SMC procedure at step 439, the new MME sends the TAU ACCEPT message, which is protected using the old security parameters, to the UE (443).

If it is determined that the attach request message is received at step 401, the procedure goes to step 461 such that the new MME performs attach-related process. The ATTACH REQUEST message received at step 460 is protected using the old security key including the old security parameters used between the old serving MME and the UE such as KSI (key set identifier), old authentication parameter or authentication vector, old NAS KSI (key set identifier), and old NAS cipher key (KNASenc) or old integrity key (KNASint). In this case, the new MME determines whether it has the security parameters for the UE 110 (463) and, if so, interprets the ATTACH REQUEST message with the security parameters (469). If the procedure progresses from step 463 to step 469, this means that the UE has been registered to the new MME but detached due to any reason and the UE and the MME share the same security-related parameters. If the new MME has no security parameter for the UE, the new MME determines whether it is possible to acquire new security-related parameters from the old MME (465). If it is impossible to acquire the security-related parameter from the old MME, the new MME fails message interpretation and thus sends an error message to the UE (479). This is for the UE sending non-security protected message or resending the security protected message.

Once the security-related parameters are received from the old MME (467), the new MME interprets the ATTACH REQUEST message using the security parameter information sent by the old MME at step 469). In order to acquire the security parameters from the old MME at step 469, the new MME has to know the old MME and the corresponding UE when the ATTACH REQUEST message is received at step 461. Such information can acquire with the knowledge about the Last visited registered TAI and the UE identifier of GUTI, i.e. OLD GUTI, and, although being security protected, it must not be ciphered such that the new MME can request the old MME for the security parameter information.

Next, the new MME decides to perform authentication (471) and thus the authentication procedure begins (473), whereby, particularly when the security authentication has failed at step 469, the new MME performs the security procedure at step 473. In case that the authentication, NAS SMC, or SMC procedure is performed at step 473, the new MME uses the new security parameters to send and receive the NAS messages (475). In case that the authentication, NAS SMC, or SMC procedure is not performed at step 473, the new MME uses old security parameters to send and receive the NAS messages (477).

FIG. 10 is a flowchart illustrating a procedure for supporting a mobility, location, and registration management of a UE in a mobile communication system according to an embodiment of the present invention. The description is directed to the processes for generating, sending/receiving, and authenticating the NAS messages.

Referring to FIG. 10, the UE determines whether it has security keys including available KSI (key set identifier), authentication parameter or authentication vector, NAS KSI (key set identifier), NAS cipher key (KNASenc) or integrity key (KNASint) (501). Here, the KSI is the identifier of the keys used in the authentication procedure between the UE and MME, and the authentication parameter or authentication vector are necessary for the authentication procedure. And, the NAS KSI is the identifier for discriminating the keys to be used for ciphering the NAS messages, and the key is the security-related key such as NAS security-related key necessary for communicating the UE and MME with the NAS messages, i.e. the NAS cipher key ($K_{NASenc}$) or integrity key ($K_{NASint}$), as well as the keys shared by the UE and MME. Here, the KSI is identical with the NAS KSI. The KSI can be the $KSI_{ASME}$ or KSISGSN value that is used in the handover situation. That is, the KSIAME basic security identifier is used for identifying the basic security key KASME and, since the NAS cipher key (KNASenc) or integrity key (KNASint) is generated from the basic security key KASME, the KSI is equal to the NAS KSI. In case of the KSISGSN which is used in the handover situation from a GERAN/UTRAN in which KSI is not KSIASME to an E-UTRAN of 3GPP LTE, the KSIAME basic security identifier is the value related to K'ASME generated from the cipher key (CK) and integrity key (IK), i.e. the value related to the key K'ASME generated through a new authentication procedure or by mapping to the EPS SECURITY CONTEXT. Accordingly, if the UE has no available security-related values, particularly, NAS KSI or NAS-related security key, i.e. NAS cipher key (KNASenc) or integrity key (KNASint) at step 501, the UE sends a non-security protected NAS message (513). If the UE has the available NAS KSI or NAS-related security key, the UE determines whether to send security protected message (503). If the UE does not want to send security protected message, the procedure goes to step 513.

If it is wanted to send security protected messages, the UE generates a NAS message using the KSI (key set identifier), authentication parameter or authentication vector, NAS KSI (key set identifier), and security key and sends the NAS message (505). Next, the UE receives new security-related parameters for the MME (507). Here, the security-related parameters include KSI (key set identifier), authentication parameter or authentication vector, NAS KSI (key set identifier), NAS cipher key (KNASenc) or integrity key (KNASint). Such security-related parameters can be acquired from the MME through the authentication procedure or the security mode command procedure. After performing step 507, the UE verifies the new security-related parameters, i.e. the security key including KSI (key set identifier), authentication parameter or authentication vector, NAS KSI (key set identifier), NAS cipher key (KNASenc) or integrity key (KNASint) (509). After the verification process, the UE uses the new security-related parameters to generate and send the NAS message (511).

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method for processing state information of a user equipment (UE) by a new mobility management entity (MME) in a mobile communication system, the method comprising:
receiving a state transition request message from the UE;
receiving an old key information from an old MME;
generating new key information when interpretation of the request message using the old key information failed;
sending the UE a non-access stratum (NAS) security mode command message including the new key information;
receiving a new state transition request message from the UE; and
interpreting the new state transition request message using the new key information.

2. The method of claim 1, wherein the old key information comprises a basic security key identifier ($KSI_{ASME}$) and a basic security key ($K_{ASME}$).

3. The method of claim 1, further comprising:
receiving, before the new state transition request message, a response to the NAS security mode command message including new key information generated by the UE.

4. The method of claim 3, wherein:
the new key information generated by the new MME comprises a NAS cipher key ($K_{NASenc}$) and an integrity key ($K_{NASint}$);
the NAS security mode command message comprises a security identifier (KSI), a UE security capability, a ciphering algorithm to be used, and an integrity algorithm; and
the new key information generated by the UE comprises a cipher key ($K_{NASenc}$) and an integrity key ($K_{NASint}$) generated based on a basic security key ($K_{ASME}$) indexed by the security identifier (KSI) of the NAS security mode command message.

5. The method of claim 1, further comprising, before generating the new key information, sending a user authentication request message to the UE when failing interpretation of the request message with the old key information and receiving a response to the user authentication request message from the UE.

6. The method of claim 5, wherein the user authentication request message comprises an authentication vector (AUTN) and a security key identifier ($KSI_{ASME}$).

7. The method of claim 1, wherein the state transition request message is one of a handover request message, a tracking area update (TAU) request message, and an attach (detach) request message.

8. A method for processing state information of a user equipment (UE) by a new mobility management entity (MME) in a mobile communication system, the method comprising:
receiving a state transition request message which is security protected with an old key from the UE;
generating new key information;
sending a non-access stratum (NAS) security mode command message having the new key information to the UE; and
receiving a response to the NAS security mode command message including new key information generated by the UE.

9. The method of claim 8, wherein:
the new key information generated by the new MME comprises a non-access stratum (NAS) cipher key ($K_{NASenc}$) and an integrity key ($K_{NASint}$);
the NAS security mode command message comprises a security identifier (KSI), a UE security capability, a ciphering algorithm to be used, and an integrity algorithm; and
new key information generated by the UE comprises a cipher key ($K_{NASenc}$) and an integrity key ($K_{NASint}$) generated based on a basic security key ($K_{ASME}$) indexed by a security identifier (KSI) of the NAS security mode command message.

10. The method of claim 9, wherein the user authentication request message comprises an authentication vector (AUTN) and a security identifier ($K_{SIASME}$).

11. A method for processing a handover in a mobile communication system by a new mobility management entity (MME), the method comprising:
receiving a forward relocation request message having old key information of a user equipment (UE) from an old MME;
receiving a tracking area update (TAU) request message which is security protected with the old key information from the UE;
generating new key information when the interpretation of the TAU request message with the old key information failed;
sending a non-access stratum (NAS) security mode command message including the new key information to the UE;
receiving a response to the NAS security mode command message including new key information generated by the UE; and
receiving a TAU request message which is security protected with the new key generated by the UE and processing the message with the new key information generated by the new MME.

12. The method of claim 11, further comprising, before generating the new key information:
sending a user authentication request message when failing interpretation of the TAU request message with the old key information; and
receiving a response to the user authentication request message from the UE.

13. A method for processing location update of a user equipment (UE) by a new mobility management entity (MME) in a mobile communication system, the method comprising:
  receiving a tracking area update (TAU), request message which is security protected with an old key information from the UE;
  sending a request to an old MME for old key information of the UE and receiving the old key information;
  generating new key information when the interpretation of the TAU request message with the old key information failed;
  sending a non-access stratum (NAS) security mode command message including the new key information to the UE;
  receiving a response to the NAS security mode command message including new key information generated by the UE; and
  receiving a new TAU request message which is security protected with the new key generated by the UE and processing the new TAU request message with the new key information generated by the new MME.

14. The method of claim 13, further comprising, before generating the new key information:
  sending a user authentication request message when failing interpretation of the TAU request message with the old key information; and
  receiving a response to the user authentication request from the UE.

15. A method for processing registration of a user equipment (UE) in a mobile communication system by a new mobility management entity (MME), the method comprising:
  receiving a registration request message which is security protected with old key information from the UE;
  sending a request to an old MME for old key information of the UE and receiving the old key information;
  generating new key information when the interpretation of the registration request message with the old key information failed;
  sending a non-access stratum (NAS) security mode command message including the new key information to the UE;
  receiving a response to the NAS security mode command message including new key information generated by the UE; and
  receiving a new registration request message which is security protected with the new key generated by the UE and processing the new registration request message with the new key information generated by the new MME.

16. The method of claim 15, further comprising, before generating the new key information:
  sending a user authentication request message when failing interpretation of the registration request message with the old key information; and
  receiving a response to the user authentication request message from the UE.

17. The method of claim 3, wherein the new state transition request message is one of a handover request message, a tracking area update (TAU) request message, and an attach (detach) request message.

18. The method of claim 5, wherein the state transition request message is one of a handover request message, a tracking area update (TAU) request message, and an attach (detach) request message.

19. The method of claim 8, wherein the state transition request message is one of a handover request message, a tracking area update (TAU) request message, and attach (detach) request message.

20. The method of claim 8, wherein:
  the information about the new key generated by the new MME sent to the UE in the NAS security mode command message comprises a security identifier (KSI), a UE security capability, a ciphering algorithm to be used, and an integrity algorithm, and
  the UE generates the new key based on the KSI such that the new key generated by the new MME and the new key generated by the UE have a same value.

* * * * *